No. 745,131. PATENTED NOV. 24, 1903.
C. A. ABBATH.
FISH HOOK ATTACHING DEVICE.
APPLICATION FILED AUG. 15, 1903.
NO MODEL.
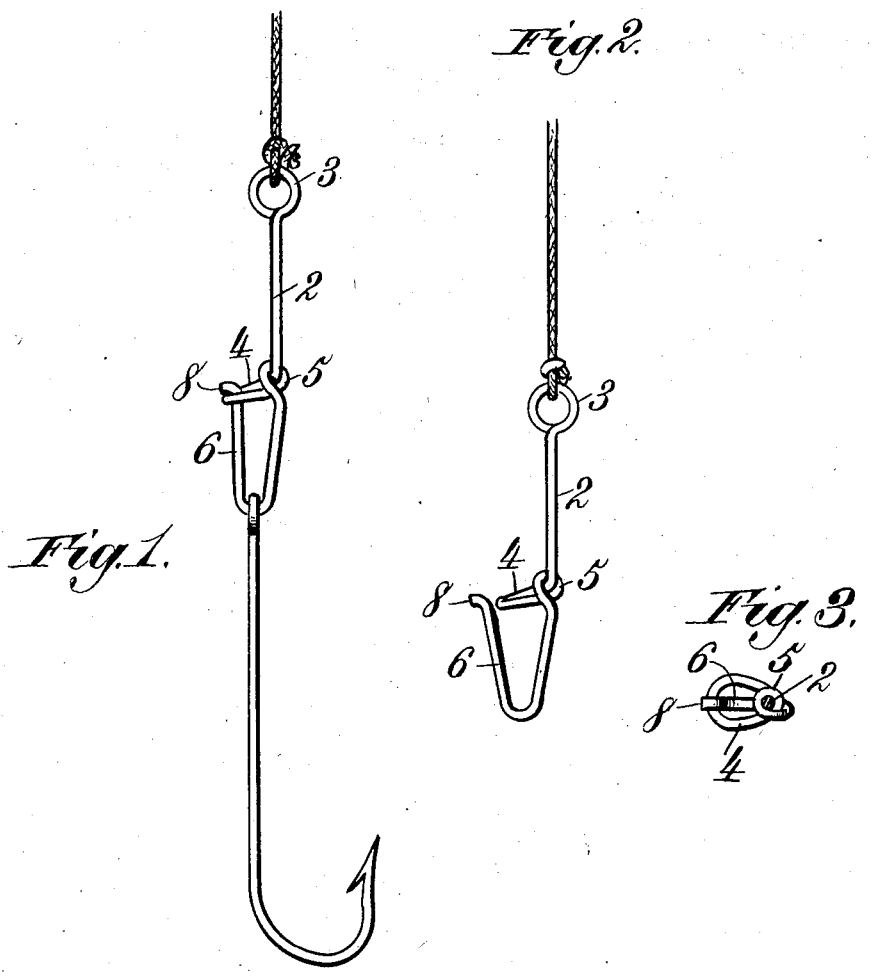

No. 745,131.
Patented November 24, 1903.

UNITED STATES PATENT OFFICE.

CHARLES A. ABBATH, OF QUINCY, ILLINOIS.

FISH-HOOK-ATTACHING DEVICE.

SPECIFICATION forming part of Letters Patent No. 745,131, dated November 24, 1903.

Application filed August 15, 1903. Serial No. 169,639. (No model.)

*To all whom it may concern:*

Be it known that I, CHARLES A. ABBATH, a citizen of the United States, residing at Quincy, in the county of Adams and State of Illinois, have invented new and useful Improvements in Fish-Hook-Attaching Devices, of which the following is a specification.

This invention relates to what I shall for convenience term a "fish-hook-attaching device," the object of the invention being to provide a light article of this character which is simple in construction, can be inexpensively made, and which can be readily connected with fishing-lines of various kinds, the hook when in place being firmly secured and capable when desired of ready removal, while a new hook can be quickly applied in place of the one removed.

It is necessary to change hooks, in fishing, a number of times a day—for example, it may become necessary to substitute a large hook for a small one, or vice versa. To unfasten a hook from a line and substitute a new one therefor ordinarily requires some time. With small hooks, which naturally have small eyes, certain lines will not pass through these small eyes, and to attach such small hooks to the lines it is necessary to split or divide the latter, which weakens the same. By virtue of my invention, one simple form of which is illustrated in the accompanying drawings, forming a part of this specification, I overcome these disadvantages.

Referring to said drawings, Figures 1 and 2 are elevations of the device in its operative and inoperative positions, respectively. Fig. 3 is a transverse section of the same.

Like characters refer to like parts throughout the several views.

To prevent the device from rusting, it is preferably made from brass, and to secure a certain requisite amount of resiliency wire is ordinarily employed.

The device consists of an elongated shank 2, having a doubled eye 3 at its upper end for connection in any convenient manner to a fishing-line. The shank 2 has between its ends the eye 4, the purpose of which will be hereinafter explained. This eye is formed by doubling the shank upon itself. Said shank is first bent upon itself between its ends, as at 5, and is then projected outward to form the eye 4 mentioned and is afterward passed around the bend 5 and then continued downward. The lower portion of the shank is bent upon itself to form the upward projection or arm 6, which normally fits within the eye 4. The arm 6, with the adjacent portion of the shank 2, forms a loop to receive a fish-hook, the latter being securely held in place when the upward projection or arm is fitted in the eye or keeper 4.

The upper or free end of the projection or arm 6 has an outward offset or catch 8 to engage over the eye 4 when the projection or arm is in its effective position. While it is not essential that this offset or catch be employed, it is preferable, as by it the projection or arm cannot be accidentally released. Should it be desired to release said projection or arm, it is first pressed toward the shank to carry the offset 8 free of the outer portion of the eye 4. The shank 2 is then flexed slightly between its ends, which will carry the upper or offset end of the arm 6 below and away from the eye 4, so that the free end of said arm or projection can be introduced into the eye of a fish-hook to apply the latter to the loop at the lower end of the shank, or a fish-hook can be removed from said loop by slipping it from off the arm.

To close the projection or arm 6 with a fish-hook on the loop, the shank is flexed and the projection pressed toward the shank until its upper end coincides with the opening of the eye 4. When this takes place, the arm and shank are released, and they will at once by their own resiliency assume their original condition with the fish-hook securely held in place.

The device is made in different sizes to receive hooks of corresponding sizes, and the application of a hook to or the removal of one therefrom are operations that require but a very short time.

The eye 4, which projects transversely from the shank, is disposed at a slight downward inclination, by reason of which the projection or arm 6 may have a slight amount of inward motion without possibility of its disengagement from said eye.

By forming the eye 4 in the manner hereinbefore described it cannot be opened by ordinary stress applied thereto, such as might, for example, be exerted by a fish.

The hooks are not connected directly to the line, but to the attaching device carried thereby, so that by means of my invention in case a fish should swallow a hook he cannot bite the line in half, an accident that is common where the hooks are directly united to the lines in the customary way.

Having thus described my invention, what I claim as new, and desire to secure by Letters Patent, is—

1. A fish-hook-attaching device consisting of a shank formed of a single strand of wire having an eye between its ends and bent on itself at its lower end and projected upward to enter said eye.

2. A fish-hook-attaching device consisting of a shank formed of a single strand of wire having an eye between its ends and bent on itself at its lower end and projected upward to enter said eye, the upper end of the projection having an offset to engage over the eye.

3. A fish-hook-attaching device consisting of an elongated shank formed of a single strand of wire doubled on itself between its ends to form an eye, the lower end of the shank being doubled on itself and projected upward and into said eye.

In testimony whereof I have hereunto set my hand in presence of two subscribing witnesses.

CHARLES A. ABBATH.

Witnesses:
WILLIAM H. GOVERT,
ALBERT DICK.